United States Patent [19]
Burke, Jr.

[11] 3,855,394
[45] Dec. 17, 1974

[54] SILICA PIGMENTS AND PREPARATION THEREOF

[76] Inventor: Oliver W. Burke, Jr., P.O. Box 2266, Fort Lauderdale, Fla. 33061

[22] Filed: Nov. 16, 1972

[21] Appl. No.: 307,083

Related U.S. Application Data

[60] Division of Ser. No. 864,954, Oct. 3, 1968, Pat. No. 3,719,741, which is a continuation of Ser. No. 698,358, Jan. 16, 1968, abandoned.

[52] U.S. Cl. .............................. 423/339, 106/288 B
[51] Int. Cl. . C01b 33/12, C01b 33/17, C01b 33/18
[58] Field of Search ......... 423/339, 421; 106/288 B, 106/308 M

[56] References Cited
UNITED STATES PATENTS

| | | | |
|---|---|---|---|
| 2,601,235 | 6/1952 | Alexander et al. | 423/339 |
| 2,940,830 | 6/1960 | Thornhill | 423/339 |
| 3,085,861 | 4/1963 | Thornhill et al. | 423/339 |
| 3,172,726 | 3/1965 | Burke, Jr. et al. | 423/339 |
| 3,172,727 | 3/1965 | Burke, Jr. et al. | 423/339 |
| 3,250,594 | 5/1966 | Burke, Jr. et al. | 423/339 |
| 3,281,210 | 10/1966 | Burke, Jr. et al. | 423/339 |
| 3,307,906 | 3/1967 | Burke, Jr. | 423/339 |
| 3,325,249 | 6/1967 | Burke, Jr. | 423/339 |
| 3,337,299 | 8/1967 | Burke, Jr. | 423/332 |
| 3,503,707 | 3/1970 | Burke, Jr. | 423/339 |
| 3,709,980 | 1/1973 | Chisholm | 423/339 |

*Primary Examiner*—Edward Stern
*Attorney, Agent, or Firm*—Hall & Houghton

[57] ABSTRACT

Silica pigments are precipitated by the acidulation of aqueous sodium silicate solution with carbon dioxide, and for controlling the characteristics of the silica pigment obtained, as evidenced by the physical properties imparted to rubber vulcanizates thereby when used as a rubber reinforcing filler, the silicate solution is maintained at different average temperatures during different stages of such acidulation, which end respectively, with the appearance of a Tyndall effect, the subsequent precipitation of at least 10 to 90 percent of the silica and the final neutralization and flocking of the precipitate.

7 Claims, No Drawings

SILICA PIGMENTS AND PREPARATION THEREOF

CROSS REFERENCE TO RELATED APPLICATIONS

This application is a division of application Ser. No. 864,954 (now U.S. Pat. No. 3,719,741) filed Oct. 3, 1968 which is a continuation of application Ser. No. 698,358 filed Jan. 16, 1968 (now abandoned).

This invention relates to silica pigment materials and to the preparation thereof from aqueous alkali metal silicate, and aims generally to improve the same.

OBJECTS

Particular objects of the present invention, severally and interdependently, are to provide an improved process for the preparation of silica pigments; to provide a process for controlling the relative sizes of the primary particles of colloidal silica and of the aggregates and flocs thereof which form the silica pigment particles, e.g. for the production of improved silica pigment materials; and to provide improved silica pigments having useful characteristics and at an economical cost.

Other objects and advantages of the invention will be apparent from a consideration of the herein set forth general and specific descriptions of illustrative embodiments thereof.

The invention resides in the new and useful features and combinations characterizing the process and products herein exemplified, and is more particularly defined in the appended claims.

GENERAL DESCRIPTION

The present invention is concerned with the production of silica pigment by the acidulation of aqueous alkali metal silicate e.g. sodium silicate, especially with carbon dioxide as acidulating agent.

The course of the acidulation of sodium silicate solution to precipitate silica therefrom according to known processes such as those set forth in my copending joint applications Ser. No. 422,144 (now U.S. Pat. No. 3,250,594) and Ser. No. 422,454 (now U.S. Pat. No. 3,325,249) can be classified in several distinct stages. Prior to acidulation, of course, is the preparatory stage in which the sodium silicate is diluted with water and in which the factor $x$ designating the weight ratio of $SiO_2$ to $Na_2O$ in the sodium silicate formula $Na_2O/(SiO_2)_x$ remains unchanged. As a practical matter, in commercial sodium silicate used for the production of precipitated silica, the value of $x$ lies below 3.8, usually in the range of about 3.0 to 3.4, e.g. 3.22 in the 41°-Be' sodium silicate of commerce.

The first period or stage in such known processes of acidulation one can call the pre-precipitation stage, during which the silica of solution is polymerizing to form colloidal particles, i.e., the primary silica particles also sometimes called the ultimate silica particles. In this stage, no appreciable number of colloidal silica particles have aggregated to form precipitating particles. The end of this stage may be considered to extend to a point at which the $x$ value lies in the range of 4.2 to 5.3 (depending on the conditions present), or may be taken at the point where a Tyndall effect appears, which usually occurs between $x$ values of 4.2 and 5.3, but can occur at as high an $x$ value as 7.0 or more under certain combinations of conditions.

The Tyndall effect concerned of course is that defined in J. Thewlis's Encyclopaedic Dictionary of Physics, Pergamon Press, 1962, as follows:

"Tyndall Effect. The scattering of light by very small particles, the scattered light being predominatly blue." This authority further states that:

"This phenomenon and its dependence on the size of the scattering particles was first investigated by Tyndall. The scattered intensity is proportional to the square of the volume of the particle and proportional to $(1/\lambda)^4$. Thus the scattering for light at the blue end of the spectrum is about ten times as great as for light at the red end."

Following the appearance of the Tyndall effect in the known processes, continuation of the acidulation causes progressive precipitation of the silica pigment. When the Tyndall effect occurs between $x$ values of 4.2 and 5.3, usually nearly 10 percent of the silica is precipitated by acidulation to an $x$ value of about 6.4 (or higher, depending on conditions present), and the precipitation of the silica pigment is substantially complete when 70 percent of the stiochiometric quantity of acidulating agent has been added, or when at least 90 percent of the silica has precipitated, at which point $x$ has a value of about 10 or more (which value may also vary with the conditions present, e.g. may be lowered to 40–50 percent of the stoichiometric amount when substantial quantities of non-acidulating electrolyte are present). Also depending on the conditions present, the extent of flocculation of the precipitate may vary.

After the precipitation has been completed, usually at least the balance of the stoichiometric quantity of carbon dioxide to convert the $Na_2O$ of the sodium silicate to $Na_2CO_3$, and generally an amount somewhat in excess thereof, is added.

It has heretofore been proposed in my aforesaid joint applications to use different rates of acidulation or different alkali metal ion concentrations in the several stages mentioned, i.e., Stage 1: while $x$ is rising to about the Tyndall effect value, or to an attained value of between 4.2 and 5.3.

Stage 2: while $x$ is rising from the aforesaid value to a value at which about 10 percent of the silica has precipitated, or a value of about 6.4.

Stage 3a: while $x$ is rising therefrom to a value of 10 or more,

Stage 3b: when the value of $x$ has risen above 10, and it has been proposed in my copending sole application Ser. No. 458,480 filed May 24, 1965 (now U.S. Pat. No. 3,307,906) to effect different dilutions of the aqueous alkali metal silicate during different stages of the acidulation, and it is to be understood that such proposals and proposals of other copending applications for patent on sole or joint inventions of the present applicant, may be employed with, and in certain instances form new combinations with, the new provisions of the present invention.

By the present invention, we have discovered that particular advantage is attained by a process for the precipitation of reinforcing silica pigment by the gradual acidulation of an aqueous solution of alkali metal silicate, especially sodium silicate, and the aid of carbon dioxide, particularly characterized in that the temperatures at which the acidulation is effected during at least two of the said three stages of acidulation are varied relative to each other in predetermined manners.

In a first embodiment of the invention, the temperature of acidulation during the first and second of said stages may be maintained at a relatively low or intermediate level, and may be increased to a higher level at that beginning of said stage 3, e.g. beginning as soon as the commencement of precipitation is observed. By this embodiment it is possible to control the size of the primary particles formed in the first stage as well as the size or compaction of the colloidal aggregates thereof formed in the second stage, by employing the lower temperature of acidulation under predetermined conditions, while controlling the flocculation and rate of separation of the precipitate by an altered temperature while the principal part of the precipitation is occurring.

In a second embodiment of the invention, the procedure may involve acidulation at relatively low or intermediate temperature during the second stage and relatively high temperature acidulation during the third stage, and may also involve relatively high temperature acidulation during the first stage. By this embodiment it is possible to control the size of the primary particles formed in the first stage, as well as the size or compaction of the flocs precipitated in the third stage, relative to the size or compaction of the colloidal aggregates developed during the second stage, and in this and other embodiments involving reduction in temperature one may find it advantageous to effect the cooling between the stages involved concurrently with dilution or aging procedures described in copending applications of the present inventor as may also be done while raising the temperature.

In a third embodiment of the invention a relatively low or intermediate temperature of acidulation may be employed in the second and third stages, and a higher temperature of acidulation in the first stage. By this procedure the size of the primary particles may be increased relative to the sizes and compactions of the colloidal aggregates and flocs thereof.

In a fourth embodiment, the higher temperatures may be employed in the second and third stages of acidulation, with the low or intermediate temperatures in the first stage. By this procedure the size of the primary particles may be reduced relative to the sizes and compactions of the colloidal aggregates and flocs thereof.

In a fifth embodiment of the invention, a higher temperature of acidulation may be employed in the second stage of the acidulation, with low or intermediate temperatures employed in the first and third stages. By this procedure the size and compaction of the colloidal aggregates may be varied relative to the size of the primary particles and relative to the size and compaction of the flocs produced.

In a sixth embodiment of the invention the higher temperatures may be employed in the first and second stages with the low or intermediate temperature employed in the third stage. By this embodiment the size of the primary particles and the size and compactions of the network particles are controlled relative to the size and compaction of the flocs obtained.

In modifications of each of these embodiments the average temperature in the 3b portion of the third stage may be maintained at either the high temperature value or at the intermediate or low temperature value, with consequent effect on the characteristics of the silica product.

In similar embodiments wherein electrolyte is introduced during or prior to the first stage, the low temperatures, rather than intermediate temperatures, may be used to better advantage.

In short, we have found that by applications of the present invention we can vary the size of the ultimate or primary particles relative to the size and compaction of the network aggregates thereof constituting the pigment particles, independently, and that by other applications of the invention we can vary the size and compaction of the flocs of network aggregates relative to the size of the network aggregates or pigment particles themselves, thus to facilitate filtration or prepare flocs well adapted for dispersion of the silica pigment to the extent required in the situs of use thereof.

In preferred species of the aforesaid embodiments: the rate of feeding of the carbon dioxide during the first stage and/or the second stage may be regulated to require a time (depending on the conditions present) of at least 30 minutes and not over 300 minutes; the high and the low or intermediate temperatures may be selected in the liquid range of water, i.e., from about 1° C. to about 100° C. at atmospheric pressure, or higher under higher pressures—preferably the higher temperature range being about 85° ± 14° C.; the intermediate range about 60° ± 10° C. and the low temperature range about 25° ± 24°C.—different ones of these temperatures—differing by at least 10° C., and preferably by at least about 20° C.—being used during selected stages of the precipitation process, and when desired the temperature change may be carried out gradually throughout part of all of the selected acidulation stage or stages; the concentration of the aqueous alkali metal silicate is maintained in the range of 0.1 to 1.8, more preferably 0.5 to 1.3 moles of $SiO_2$ per liter during all or selected stages of the precipitation process; controlled agitation may be maintained during all or selected stages of the precipitation process; the aqueous alkali metal silicate may be maintained essentially free of quantities of metal salt other than that resulting from the acidulation of the alkali metal silicate or alkali metal salts may be added as electrolyte; and the rates of acidulation during the first and second acidulation periods may be relatively adjusted to aid in controlling the relative sizes of the primary particles, the network particles, and the pigment flocs.

After the flocs of precipitated silica pigment have been formed they may be recovered from the mother liquor in any suitable or preferred manner, e.g. by centrifuging, filtering, etc., and the silica pigment may be removed as wet cake or otherwise, and may be used per se, or be subjected to after-treatments appropriate for their intended use.

The carbon dioxide gas employed in this invention may be full strength or may be diluted with air or other inert gases, e.g. such as the dilute carbon dioxide gas produced by the combustion of hydrocarbons such as propane or butane —see for example, copending applications Ser. No. 458,132 filed May 24, 1965 (now U.S. Pat. No. 3,372,046). It may be fed at constant rate or at somewhat varied rates during the respective acidulation periods, and while constant or substantially constant rates are preferred for uniformity of procedure and to facilitate process control, variations of course are permissible which essentially afford an average rate of the order of that referred to and which do not so far depart therefrom as to materially affect the result obtained.

The process of the invention may be conducted in a batchwise or stepwise manner, or continuously, depending on available equipment. Suitable apparatus, for example, is set forth in copending joint application Ser. No. 142,668 (now U.S. Pat. No. 3,256,068), in which, for example, the present invention can be practiced as a continuous process wherein the acidulation steps are applied to moieties of the alkalimetal silicate solution in a series of zones of differently selected temperatures.

In the examples herein, certain after-treatments are employed in each of the examples of the respective series set out to exemplify the invention and its advantages, but the particular after-treatments are not limiting of the invention claimed herein, and the novel ones thereof are claimed in other applications.

The silica product as wet slurry or filter cake may be masterbatched with latices of natural or synthetic elastomers and/or plastomers.

The novel features and combinations of the invention set forth in the claims appended hereto, but the practice of the invention itself will be more precisely understood by reference to the following specific examples embodying the same, which are to be considered as illustrative and not restrictive of the invention.

EXAMPLES

The examples set forth herein were carried out in the following manner:

To a precipitator vessel equipped with an agitator was added 10 liters of 41° Be' aqueous solution containing 20 moles sodium silicate of the composition represented by $Na_2O/(SiO_2)_{3.22}$ and 63 liters of water.

The temperature of the sodium silicate solution was adjusted to the selected temperature level for the first acidification stage and then prior to the second and/or third stage of acidulation adjusted to another selected temperature level where applicable, as shown in Tables I and II.

The acidulating agent was carbon dioxide and it was fed into the sodium silicate solution to relative constant rates throughout each of the acidulation periods to most clearly demonstrate the effects of the present invention, unaffected by variations of other factors contemplated in the more general applications of the invention above described.

The details as to the conditions pertaining to the several stages of the acidulation in the comparative examples (Examples 1, 5 and 6) and in the examples of the invention (Examples 2–4 and 7–9) are given in Tables I and II:

Table I

| Example No. | 1 (Comp) | 2 | 3 | 4 |
|---|---|---|---|---|
| Run No. | 60 | 237 | 228 | 236 |
| Acidulation Stage 1: | | | | |
| Temperature - Initial (°C.) | 80 | 60 | 80 | 80 |
|     -Final (°C.) | 80 | 60 | 80 | 80 |
| Time - Total (min.) | 165 | 210 | 180 | 150 |
| $CO_2$ Flow meter rating | 4 | 4 | 4 | 4 |
| Acidulation - Initial (%) | 0 | 0 | 0 | 0 |
|     - Final (%) | 28 | 42.5 | 36 | 21 |
| x-value - Initial | 3.22 | 3.22 | 3.22 | 3.22 |
|     -Final [1] | 4.5 | 4.8 | 5.0 | 4.1 |
| Stage 2: | | | | |
| Temperature - Initial (°C.) | 80 | 60–80[3] | 80–60[4] | 80 |
|     - Final (°C.) | 80 | 120 | 60 | 80 |
| Time - Total (min.) | 135 | 30 | 260 | 150 |
| $CO_2$ Flow meter rating | 4 | 4 | 4 | 4 |
| Acidulation - Initial (%) | 28 | 42.5 | 36 | 21 |
|     - Final (%) | 51 | 67.5 | 79.5 | 52.3 |
| x-value - Initial | 4.5 | 4.8 | 5.0 | 4.1 |
|     - Final[2] | 6.8 | 9.9 | 15.7 | 6.7 |
| Stage 3: | | | | |
| Temperature - Initial (°C.) | 80 | 80 | 60 | 80–60[4] |
|     - Final (°C.) | 80 | 80 | 60 | 60 |
| Time - Total (min.) | 375 | 300 | 250 | 345 |
| $CO_2$ Flow meter rating | 4 | 4 | 4 | 4 |
| Acidulation - Initial (%) | 51 | 67.5 | 79.5 | 52.3 |
|     - Final (%) | 115 | 119 | 120.3 | 125 |

[1] Tyndall point
[2] precipitation occurring
[3] heating time 4 minutes
[4] cooling time 6 minutes Table II

| Example No. | 5 (Comp) | 6 (Comp) | 7 | 8 | 9 |
|---|---|---|---|---|---|
| Run No. | 247 | 191 | 231 | 223 | 233 |
| Acidulation Stage 1: | | | | | |
| Temperature - Initial (°C.) | 60 | 80 | 60 | 80 | 80 |
|     - Final (°C.) | 60 | 80 | 60 | 80 | 80 |
| Time - Total (min.) | 102 | 88 | 90 | 60 | 100 |
| $CO_2$ Flow meter rating | 12 | 12 | 12 | 12 | 12 |
| Acidulation - Initial (%) | 0 | 0 | 0 | 0 | 0 |
|     - Final (%) | 50 | 41.6 | 49 | 39 | 38 |
| x-value - Initial | 3.22 | 3.22 | 3.22 | 3.22 | 3.22 |
|     - Final [1] | 6.4 | 5.5 | 6.3 | 5.3 | 5.2 |

Table II — Continued

| Example No. | 5 (Comp) | 6 (Comp) | 7 | 8 | 9 |
|---|---|---|---|---|---|
| Stage 2: | | | | | |
| Temperature - Initial (°C.) | 60 | 80 | 60–80[1] | 80–60[4] | 80 |
| - Final (°C.) | 60 | 80 | 80 | 60 | 80 |
| Time - Total (min.) | 48 | 39 | 30 | 30 | 40 |
| $CO_2$ Flow meter rating | 12 | 12 | 12 | 12 | 12 |
| Acidulation - Initial (%) | 50 | 41.6 | 49 | 39 | 38 |
| - Final (%) | 76 | 60 | 65 | 62.5 | 60 |
| x-value - Initial | 6.4 | 5.5 | 6.3 | 5.3 | 5.2 |
| - Final [2] | 13.4 | 8.0 | 9.2 | 8.6 | 8.0 |
| Stage 3: | | | | | |
| Temperature - Initial (°C.) | 60 | 80 | 80 | 60 | 80–60[4] |
| - Final (°C.) | 60 | 80 | 80 | 60 | 60 |
| Time - Total (min.) | 90 | 128 | 105 | 120 | 110 |
| $CO_2$ Flow meter Rating | 12 | 12 | 12 | 12 | 12 |
| Acidulation - Initial (%) | 76 | 60 | 65 | 62.5 | 60 |
| - Final (%) | 124 | 120 | 122 | 141 | 125 |

[1] Tyndall point
[2] precipitation occurring
[3] heating time 4 minutes
[4] cooling time 6 minutes The silica pigment precipitates were filtered and washed until soluble salts were less than 1 percent; and for acidic salt after-treated samples a portion of each was treated with 10 percent aluminum sulphate until the pH reached 4.0; and for the acid after-treated samples a portion of each was acidified with sulfuric acid to a pH of 4.0. Each of the treated samples was filtered; dried overnight at 105° C.; and micropulverized.

The silica pigment materials designated in Tables IA and IIA as the acidic salt (A-S-T) and acid-treated (A-T) samples of Examples 1 through 9 were each compounded with a butadiene-styrene type elastomer (SBR-1502), according to the compounding recipe set forth in Table III hereof (novel features of which are claimed in copending application Ser. No. 480,151, now U.S. Pat. No. 3,399,166).

TABLE III

| Compounding Ingredients | Quantities (Wt. parts) |
|---|---|
| Butadiene-styrene copolymer (SBR-1502) | 100 |

TABLE III-Continued

| Compounding Ingredients | Quantities (Wt. parts) |
|---|---|
| Silica pigment material | 50 |
| Antioxidant (Antioxidant 2246) 2,2-methylene-bis (4-methyl-6-t.butylphenol) | 2 |
| Carbon black (Statex M)[1] | 2 |
| Paracoumarone-indene resin (Cumar RH) | 10 |
| Magnesia | 4 |
| Zinc oxide | 1 |
| N-tert-butyl-2-benzothiazole-sulfenamide (Santocure NS) | 0.75 |
| N,N'-di-o-tolylguanidine (DOTG) | 1.5 |
| Sulfur | 3 |
| Modified phthalic anhydride (Retarder PD) | 0.75 |
| Triethanolamine | 1 |
| Monoethanolamine | 1 |

[1] Carbon black optional and at 2 part level no appreciable effect on vulcanizate properties.

These compounds were aged overnight, re-milled and cured for 120 minutes at 287° F.

The physical test data for the respective vulcanizates containing the after treated samples of the silica pigment examples of Tables I and II, is set forth in Tables IA and IIA hereof, respectively:

Table IA

Test Data

| Example No. | After Treatment | Hardness (Shore A) | 300% Modulus (psi) | 500% Modulus (psi) | Ult. Tensile (psi) | Elong. (%) | Goodrich Flex. (ΔH, °C.) |
|---|---|---|---|---|---|---|---|
| 1 (Comp) | A-S-T | 56 | 630 | 1550 | 3410 | 700 | 44 |
| 1 (Comp) | A-T | 58 | 915 | 2160 | 3150 | 615 | 50 |
| 2 | A-S-T | 84 | 1345 | 3135 | 4655 | 630 | — |
| 2 | A-T | 82 | 1245 | 2930 | 4300 | 600 | — |
| 3 | A-S-T | 71 | 765 | 1690 | 3505 | 660 | 57 |
| 3 | A-T | 74 | 1180 | 2505 | 4015 | 640 | 66 |
| 4 | A-S-T | 56 | 615 | 1610 | 3790 | 700 | 35 |
| 4 | A-T | 60 | 1230 | 2840 | 3535 | 575 | 38 |

Table IIA

Test Data

| Example No. | After Treatment | Hardness (Shore A) | 300% Modulus (psi) | 500% Modulus (psi) | Ult. Tensile (psi) | Elong. (%) |
|---|---|---|---|---|---|---|
| 5 (comp) | A-T | 83 | 1545 | 3090 | 3625 | 555 |
| 6 (comp) | A-T | 75 | 1235 | 3070 | 3880 | 560 |
| 7 | A-T | 85 | 1380 | 3250 | 4495 | 590 |
| 8 | A-T | 74 | 1180 | 2505 | 4015 | 640 |
| 9 | A-T | 72 | 960 | 2385 | 4225 | 660 |

Tables I and IA show that at a slow rate of acidulation throughout (Examples 1, 2, 3 and 4), as compared to use of the higher temperatures throughout (Example 1):

1. use of the relatively low intermediate temperature in Stage 1 and the higher temperatures in Stages 2 and 3 (Example 2) gave harder stocks and better tensile values, making said stocks better suited for suspension members not subjected to severe dynamic loading.
2. use of the relatively low intermediate temperatures in Stages 2 and 3, and the relatively high temperature in Stage 1 (Example 3), gave stocks of augmented tensile strength and only moderately increased hardness, well adapted for mechanical goods as distinguished from tires.
3. use of the relatively low intermediate temperature in Stage 3, and the relatively high temperature in Stages 1 and 2 (Example 4), gave stocks of substantially augmented tensile strength, with essentially no increase in hardness and with greatly improved heat build-up characteristics, rendering the stock especially suitable for goods subjected to prolonged dynamic stress, such as tires.

Furthermore, this table shows that these significant changes in characteristics are effected with only a 20° C. difference in the temperatures employed at the several stages. When the difference in temperatures are increased to 40° C., or even 60° C., the effects of the invention are even more pronounced.

Tables II and IIA (Examples 5–9) show that at a relatively rapid rate of acidulation throughout, as compared to the use of the relatively low intermediate temperature throughout (comparative Example 5):

1. the use of the relatively low intermediate temperature in the first stage only, with the higher temperatures in the second and third stages (Example 7) gave a stock having substantially augmented tensile strength with only slight increase in hardness, again affording an advantage in the case of relatively rigid suspension members;
2. the use of the relatively low intermediate temperature in the second and third stages and of the relatively higher temperature in the first stage (Example 8) gave a stock having not only an increased tensile strength but also a decreased hardness, and thus better suited for uses requiring these characteristics;
3. the use of the relatively low intermediate temperature in the third stage only, with the relatively high temperature in the first and second stages (Example 9), gave a stock of substantially increased tensile strength and which also has a relatively reduced hardness, adapting it especially for use where this combination of characteristics is desirable.

Still referring to Tables II and IIA, it will be seen that at the relatively rapid rate of acidulation throughout, as compared to the use of the relatively high temperature throughout (comparative Example 6):

1. the use of the temperature combination of Example 7 gave a stock of substantially increased tensile strength and hardness;
2. the use of the temperature combination of Example 8 gave a stock of increased tensile strength without significant change of hardness; and
3. the use of the temperature combination of Example 9 gave a stock of still further increased tensile strength and somewhat reduced hardness;

thus in each instance modifying the characteristics of the vulcanizates in respects desirable in different fields of use.

While there have been described herein what are at present considered preferred embodiments of the invention, it will be obvious to those skilled in the art that modifications and changes may be made therein without departing from the essence of the invention. It is therefor understood that the exemplary embodiments are illustrative and not restrictive of the invention, the scope of which is defined in the appended claims, and that all modifications that come within the meaning and range of equivalents of the claims are intended to be included therein.

I claim:

1. A process for the production of silica pigment which comprises
    a. maintaining an aqueous solution of alkali metal silicate at a first average temperature within the liquid range of water during a first stage of acidulation while feeding carbon dioxide into the solution in an amount sufficient to form primary silica particles in colloidal suspension in the solution and to provide the appearance of a Tyndall effect in the solution, the time span from the commencing of the feeding of carbon dioxide until the appearance of the Tyndall effect being 30 to 300 minutes
    b. maintaining the composition produced by step (a) at a second, higher average temperature within the liquid range of water during a second stage of acidulation while continuing the feeding of carbon dioxide into the composition, said second stage of acidulation beginning with the appearance of the Tyndall effect and ending when sufficient carbon dioxide has been fed to effect precipitation as pigment of about 10 percent of the silica content of the composition, said second average temperature being at least 10° C. higher than said first average temperature, and the duration of said second stage being about 30 to 300 minutes,
    c. continuing the precipitation of the silica by continuing the feeding of carbon dioxide into the composition produced by step (b) until at least 90 percent of the silica has precipitated as pigment, while maintaining the temperature of the composition within the liquid range of water, d. continuing the feeding of carbon dioxide into the composition produced by step (c) until at least enough thereof has been fed to convert substantially all of the $Na_2O$ content of the composition to $Na_2CO_3$, and e. recovering the precipitated silica pigment from the mother liquor.

2. The process of claim 1 wherein the alkali metal silicate is sodium silicate and the aqueous solution of sodium silicate in step (a), prior to being contacted with the carbon dioxide, contains a weight ratio of $SiO_2$ to $Na_2O$ of less than 3.8 to 1.

3. The process of claim 1 wherein the average temperature of the solution in step (a) is maintained within the range of about 1° to 70° C.

4. The process of claim 1, wherein the average temperature of the composition in step (b) is maintained within the range of about 71° to 99° C.

5. The process of claim 1, wherein step (c) the pigment is removed as wet cake.

6. The process of claim 1, wherein, to form a dry product, in step (e) the pigment recovered from the mother liquor is filtered, washed and dried.

7. A process for the production of silica pigment which comprises a. maintaining an aqueous solution of alkali metal silicate at a first average temperature within the liquid range of water during a first stage of acidulation while feeding carbon dioxide into the solution in an amount sufficient to form primary silica particles in colloidal suspension in the solution and to provide the appearance of a Tyndall effect in the solution, the time span from the commencing of the feeding of carbon dioxide until the appearance of the Tyndall effect being 30 to 300 minutes.

b. maintaining the composition produced by step (a) at a second, higher average temperature within the liquid range of water during a second stage of acidulation while continuing the feeding of carbon dioxide into the composition, said second stage of acidulation beginning with the appearance of the Tyndall effect and ending when sufficient carbon dioxide has been fed to effect precipitation as pigment of about 10 percent of the silica content of the composition, said second average temperature being at least about 20°C. higher than said first average temperature, and the duration of said second stage being about 30 to 300 minutes, c. continuing the precipitation of the silica by continuing the feeding of carbon dioxide into the composition produced by step (b) until at least 90 percent of the silica has precipitated as pigment, while maintaining the temperature of the composition within the liquid range of water, d. continuing the feeding of carbon dioxide into the composition produced by step (c) until at least enough thereof has been fed to convert substantially all of the $Na_2O$ content of the composition to $Na_2CO_3$, and e. recovering the precipitated silica pigment from the mother liquor.

* * * * *